C. T. SLEEPER.
STUFFING-BOX FOR STEAM-ENGINES.

No. 180,948. Patented Aug. 8, 1876.

Witnesses:
N. H. Sherburne
N. Cowles

Inventor:
Charles T. Sleeper
By Gridley & Sherburne
Attys.

UNITED STATES PATENT OFFICE.

CHARLES T. SLEEPER, OF CHICAGO, ILLINOIS, ASSIGNOR OF ONE-HALF HIS RIGHT TO CHARLES C. JEROME, OF SAME PLACE.

IMPROVEMENT IN STUFFING-BOXES FOR STEAM-ENGINES.

Specification forming part of Letters Patent No. 180,948, dated August 8, 1876; application filed July 3, 1876.

*To all whom it may concern:*

Be it known that I, CHARLES T. SLEEPER, of Chicago, in the county of Cook and State of Illinois, have invented certain new and useful Improvements in Stuffing-Boxes for Steam-Engines; and I do hereby declare the following to be a full, clear, and exact description thereof, which will enable others skilled in the art to which my invention appertains to make and use the same, reference being had to the accompanying drawing, forming part of this specification, in which—

Figure 1:
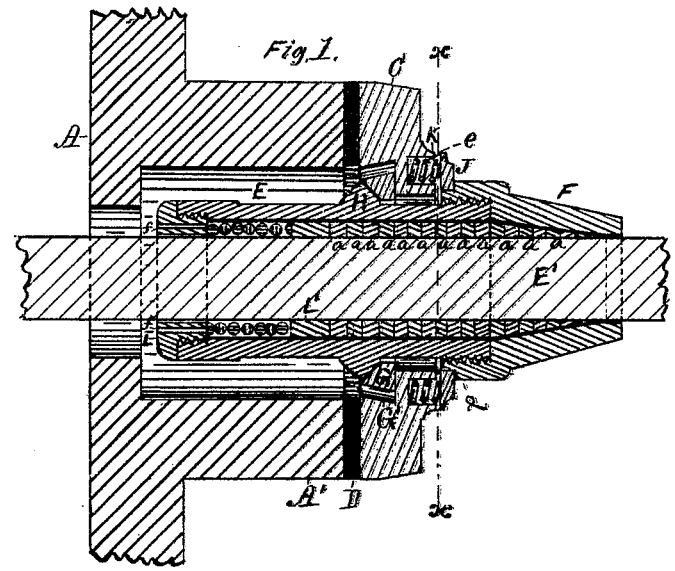
Figure 2:
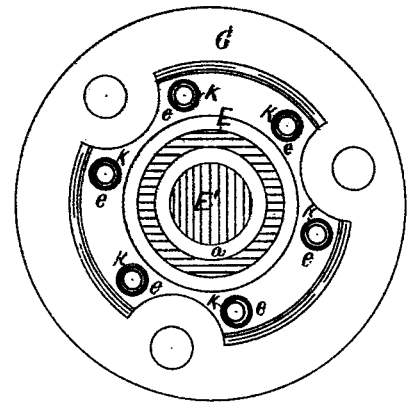

Figure 1 represents a longitudinal central section of a stuffing-box embodying my said invention; and Fig. 2 represents a transverse section of the same, showing those parts which are at the left-hand of the line $x\,x$ in Fig. 1.

Like letters of reference indicate like parts.

My invention relates to that class of stuffing-boxes employed in connection with the piston-rod or valve-stem of steam-engines; and the object of my invention is to provide a stuffing-box for the use of metallic packing, and to so arrange the stuffing-box as to admit of automatic adjustment to and in line with the piston-rod or valve-stem without leakage of steam, and so as to prevent any uneven strain or wear of the packing by the action of the piston-rod or valve-stem.

In the drawing, A represents a section of the cylinder-head, which is constructed in the usual manner, and is provided on its outer side with an annular flange, A', surrounding the piston-rod, and so arranged as to produce a vacant space between its inner surface and the outer surface of the rod. C is an annular plate, permanently bolted to the end of the flange A', as shown in Fig. 1. D is an annular piece of india-rubber, or other suitable flexible material, which is secured between the end of the flange A' and the plate C, and forming a steam-tight joint. E is the body of the stuffing-box, consisting of a metal tube or sleeve passing centrally through the plate C into the cavity in the flange A', and through which sleeve the piston-rod E' passes. The diameter of the cavity in this sleeve exceeds the diameter of the piston-rod, so as to receive a series of metallic rings, $a$, which pass around the piston-rod and form the packing. F is a conical cap, which is screwed upon the sleeve E, as shown in Fig. 1. The diameter of the cavity of this cap, at its inner end, is equal to the cavity of the sleeve E, and converging toward its outer end, so as to only slightly exceed the diameter of the piston-rod. The diameter of the opening in the plate C, through which the sleeve E passes, exceeds the diameter of the sleeve sufficiently to admit of a radial movement of the sleeve within the opening, by which means the sleeve can freely adjust itself to and in line with the piston-rod. G is an annular ring loosely fitted around the sleeve, and within an annular recess, G', formed in the inner face of plate C, and around the opening through which the sleeve passes. The back of the ring G is so fitted against the plate at the end of the recess as to form a steam-tight joint, and the diameter of the ring is less than the diameter of the recess, so as to allow the ring to move in the recess radially with the sleeve. The face of the ring G is made concave, and is adjusted to fit the convex collar H on the sleeve, and so as to form what is known as a ball-and-socket joint and a steam-tight joint.

J is an annular plate, loosely fitted upon and around the inner end of the cap F, and is adjusted to bear against the shoulder $d$ in said cap. K represents a series of coiled springs fitted into recesses $e$, formed in the outer surface of the plate C, and are adjusted to bear against the plate J, as shown in Fig. 1. The tension of said springs is such as to force cap F and sleeve E outward, and so as to compress ring G between the collar H and under face of plate C, thereby keeping the joints tight when the sleeve is released from the pressure of the steam, by the exhaust of the steam from the cylinder, and preventing plate J from coming in direct contact with plate C, and thereby permit of the radial movement of the plate J with the sleeve and cap. L is a screw-threaded cap, which is secured to the inner end of the sleeve E, as shown in Fig. 1, and through which the piston-rod loosely passes. L' is an annular metal ring or follower, loosely secured upon the piston-rod, and adjusted to bear against the packing-rings $a$. M is a coiled spring, loosely secured upon and around the piston-rod, between the cap L and the follower L'. The cap L is provided with a series of perforations, $f$, formed in its end, and through which the steam passes from the cylinder into the sleeve, and by the impact of the steam against the follower L' the rings $a$ are forced outward, so as to cause the outer rings to wedge between the piston-rod and the converging surface of the cap F, thereby forming a perfect steam-tight joint.

It is readily perceived that this arrangement of the sleeve, and the parts acting in conjunction therewith, is such that the sleeve is free to move radially, so as to adjust itself to and in a line with the piston-rod, and thereby prevent the packing from irregular lateral strain by the action of the piston-rod; and by providing the ball-and-socket joint between the collar H and ring J, the latter can move on the plate C without rocking, thereby insuring a steam-tight joint, irrespective of the position of the piston-rod.

I do not claim the arrangement of the metallic packing-rings, as the same is made the subject-matter of an application previously filed by myself.

Having thus described my invention, what I claim as new, and desire to secure by Letters Patent, is—

1. The tubular sleeve E, provided with the conical cap F, adjusted to extend through and admit of a radial movement within the plate C, substantially as and for the purpose specified.

2. The combination, with the plate C, sleeve E, provided with the conical cap F and collar H, of the ring G, fitted around the said sleeve between the collar and the plate, substantially as and for the purpose specified.

3. The combination, with the cap F and plates C and J, of the springs K, substantially as and for the purpose specified.

CHARLES T. SLEEPER.

Witnesses:
N. C. GRIDLEY,
N. H. SHERBURNE.